May 7, 1968 YOW-JIUN HU 3,381,398

IDENTIFICATION CARD APPARATUS

Filed Oct. 22, 1965

Inventor

Yow Jiun Hu

By Jacob Frank

Attorney

United States Patent Office 3,381,398

Patented May 7, 1968

3,381,398

IDENTIFICATION CARD APPARATUS

Yow-Jiun Hu, Alexandria, Va., assignor to Farrington Business Machines Corporation, Springfield, Va., a corporation of Massachusetts Filed Oct. 22, 1965, Ser. No. 501,227
9 Claims. (Cl. 40—10)

ABSTRACT OF THE DISCLOSURE

A device for inserting identification sheets such as photo chips into transparent, plastic card receptacles is disclosed. Typically the card receptacle is pre-embossed for use with printing machines, such as imprinters. The identification sheet inserting device is a rigid metal or plastic plate having dimensions to accommodate the dimensions of the plastic card receptacle. The inserting device includes a portion for receiving the photo chip and holding it in place when the chip is inserted in the card receptacle. The receiving portion comprises either two parallel plates of equal size or one plate of sufficient size to hold the photo chip and another plate parallel to the first plate of sufficient size to hold the chip in place. The photo chip receiving portion is recessed at one end thereof so that once the chip inserting device has been inserted into the plastic card receptacle, the chip may be held within the card receptacle by grasping it at the recessed portion while at the same time the chip inserting device may be removed from the card receptacle.

The present invention relates to a identification card system and more specifically to apparatus for inserting an identification sheet within a plastic card receptacle.

In many types of idenfication card systems, it is more expedient to manually assemble an identification card. One example of such a system would be in an instance where it is desired to issue an identification card at the point when information is obtained from the eventual user of the card. In many of such cases the user's picture may be taken and shortly thereafter inserted in sheet form with other pertinent information within a plastic card receptacle which may have been pre-embossed for use with printing mechanisms well known in the art, such as that disclosed in U.S. Patent No. 2,620,729 to C. H. Gilbert, issued Dec. 9, 1952. In employing such a system, it is desired to provide apparatus for inserting the identification sheet within the plastic card receptacle for; the identification sheet might be fairly thin and thus damaged if one were to insert the same solely by hand, the identification sheet might be a photo chip to be used immediately after the photo developing process and thus the sticky and/or wet information bearing surface of the photo chip might be smeared if it were to be rubbed against the plastic card receptacle, the identification sheet might have an adhesive coating thereon, and/or it might be necessary to properly register the identification sheet within the plastic card receptacle. Also, the opening of the plastic card receptacle might be damaged or stretched in attempting to insert the identification sheet therein.

The general purpose of this invention is to provide such a new and improved identification card insertion apparatus which obviates the above noted problems encountered when inserting an identification sheet into a plastic card receptacle by hand alone. Briefly the instant embodiment discloses a generally rectangular shaped tray adapted to position an identification card placed thereon and providing means for easily and quickly removing the tray once the identification sheet has been inserted within a three sided plastic card receptacle. Also provided are means for preventing a wet and/or sticky identification sheet from smudging, when the tray is removed from the plastic card receptacle.

Objects of the invention are to provide a identification card inserting apparatus for use with plastic card receptacles which provides for neat and quick insertion of identification sheets.

Other objects, advantages and capabilities of the present invention will become apparent from the following detailed description, taken in conjunction with the accompanying drawings, illustrating preferred embodiments of the invention.

In the drawings:

FIGURES 1*a*, 1*b* and 1*c* are front perspective views respectively of a card inserter, identification sheet and plastic card receptacle disclosing a use of the instant invention.

Figure 4:
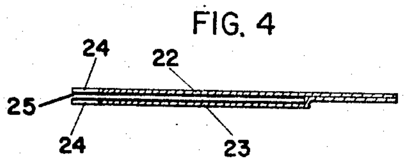

FIGURE 4 discloses another embodiment of the card inserter.

Figures 5, 6:
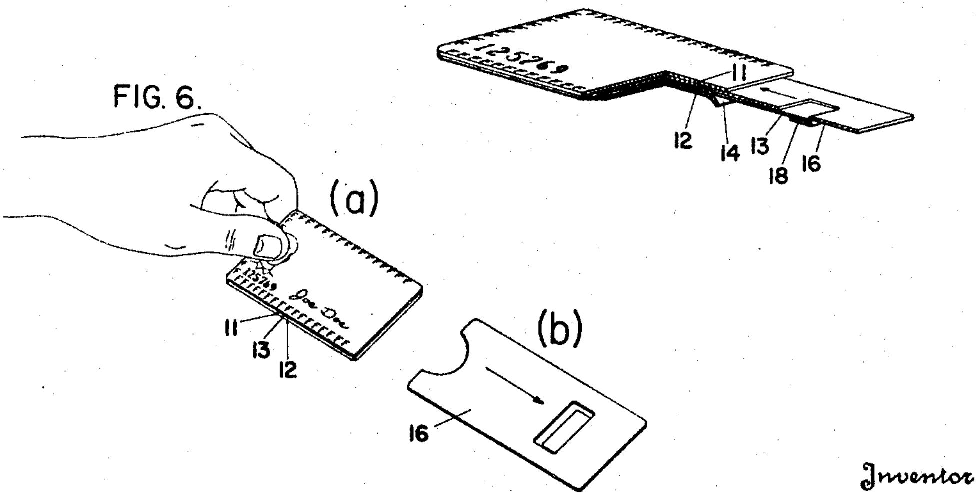

FIGURE 5 shows an isometric view of the card inserter and identification sheet being placed within the plastic card receptacle.

FIGURE 6 is an isometric view showing the inserter being removed from the plastic card receptacle after having placed the identification sheet therein.

Figure 1:
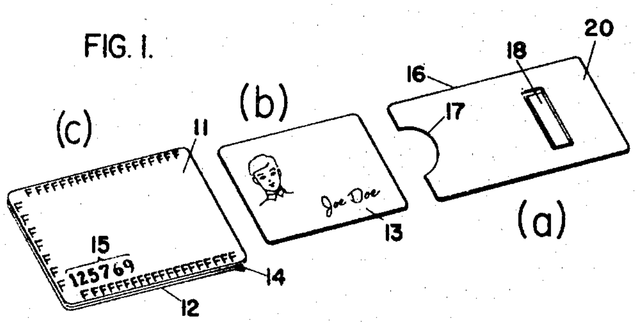

The apparatus, a preferred embodiment of which is illustrated in FIGURES 1*a*, 1*b* and 1*c*, includes a pair of transparent plastic sheets 11 and 12 which are sealed together about three sides thereof in sandwich-like fashion, the fused area denoted by the area adjacent the embossed pattern F located about three sides thereof to form a pocket for receiving an identification sheet 13 through opening 14. The top plastic sheet 11 is also shown to contain embossed characters 15 adapting the card for use with printing mechanisms, as is well known in the art, to produce printed copies.

The particular identification sheet shown is a photo chip containing the specific user's picture and other relevant written information. To insert the identification sheet into the pocket defined by the plastic sheets, a card inserter member 16 is employed which is a preferred embodiment of the invention. In view of the function to be performed by member 16 it may be likened unto a shoehorn.

Figure 2:
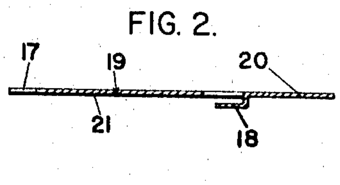
FIGURE 2 is a side elevation of the card inserter shown in FIGURE 1*a*.
Figure 3:
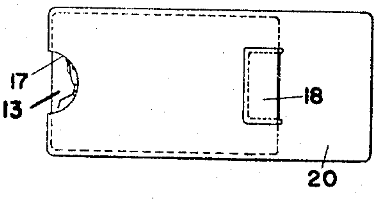
FIGURE 3 shows a plan view of the card receptacle disclosed in FIGURE 1*a* having an identification sheet placed thereon.

The card inserter member, as disclosed in FIGURE 1*a*, 2 and 3, is a rigid plate made from metal or plastic and is of rectangular shape to accommodate the width and length of the pocket formed by the plastic sheets. At the end of the inserter member which first passes into the pocket is an indenture or finger tip shaped cut-out 17. Toward the further end of the inserter member a rectangular stop piece 18 is punched out, raised and formed to take on a right angled configuration one part of which overhangs a plane defined by the exterior surface of the inserter member. The area 20 of the inserter member to the right of piece 18 acts as a handle for easy manipulation.

In some instances where the identification sheet has an adhesive coating and/or the photo chip is employed directly after being photographed and it may be wet and/or sticky, it would be desired to cover the surface 19 of inserter member 16 with a layer of material 21 to prevent the identification sheet from being smeared or sticking thereto, either by coating the same with a material such as that sold under the trademark Teflon, or adhering to surface 19 a sheet of coated material such as silicone treated sheeting.

FIGURE 4 discloses yet another embodiment of the present invention comprising rigid plates 22 and 23 which are joined at one end to act as a handle and separated at the other end for receiving therebetween a identification sheet, each left end of the plates having common indentures for finger tip shaped cut-outs 24. Again, it may be desirable to provide anti-adhesive layers 25 on the inner sides of the separated portions of plates 22 and 24.

In operation it may be observed from FIGURE 3 that the photo chip 13 is placed with its sticky information bering surface opposite non-sticking layered surface 21 of the inserter member, and under the overhanging stop piece 18. In this position it is noted that a portion of the photo chip extends into the area exposed by finger tip shaped cut-out 17 and the sides of the photo chip are covered and protected by the card inserter member. Once in position the inserter member with the photo chip is inserted through opening 14 into the pocket formed by the plastic sheets (see FIGURE 5) until it is pushed back into the desired position. Then by placing a finger and thumb on opposite sides of the plastic sheets to squeeze the photo chip at the area exposed by the finger tip shaped cut-out as shown in FIGURE 6, the card inserter member may be removed from between the plastic sheets leaving the photo chip in its preferred position. By utilizing the non-sticking layer 21 as shown in FIGURE 2, the photo chip face will not be smeared upon removal of the card inserter member.

It should be understood, of course, that the foregoing disclosure relates to only a preferred embodiment of the invention and that numerous modifications or alterations may be made therein without departing from the spirit and scope of the invention, it is desired, therefore, that only such limitations be placed on the invention as are imposed by the prior art as set forth in the appended claims.

What is claimed is:

1. For use with an identification card having a transparent pocket, the improvement comprising a first plate for positioning an identification sheet in said pocket, a second plate connected to and near one end of said first plate and spaced from said first plate for holding said identification sheet, said second plate having a width which approximates the width of said first plate and a length which is substantially less than the length of said first plate, and said first plate including a recess disposed in one end thereof for partially exposing the identification sheet placed in said first plate when said first plate is inserted in said transparent pocket.

2. For use with an identification card according to claim 1, including anti-adhesive means provided on said first plate at the area to be occupied by the identification sheet.

3. For use with an identification card according to claim 1, including a handle secured to said first plate.

4. For use with an identification card having a transparent pocket, a rigid tray for positioning an identification sheet in said pocket, said tray being provided with said identification sheet receiving portion and a handle, means for locating an identification sheet on said tray at said identification sheet receiving portion, a recess partly disposed in the said receiving portion to be occupied by said identification sheet, said locating means comprising a plate adapted to cover substantially all of said area on the tray to be occupied by said identification sheet.

5. For use with identification cards according to claim 1 where said second plate is punched out to form a guide for locating the identification sheet on said first plate.

6. For use with an identification card according to claim 4, including anti-adhesive means provided on said tray and said plate at the surface areas which face said identification sheet which is to face an identification sheet placed therebetween.

7. For use with an identification card, a tray, said tray being provided with a handle, said plate being punched out to form a guide for locating an identification sheet on said tray, a groove in one end of said tray adapted to overlies an area to be occupied by an identification sheet, means for providing an anti-adhesive surface on the exterior of the tray to face the identification sheet.

8. For use with an identification card having a transparent pocket, the improvement comprising a first plate for positioning an identification sheet in said pocket, a second plate connected to and near one end of said first plate and spaced from said first plate for holding said identification sheet, said second plate having a width which approximates the width of said first plate and a length which is substantially the same as the length of said first plate, and said first plate including a recess disposed in one end thereof for partially exposing the identification sheet placed in said first plate when said first plate is inserted in said transparent pocket.

9. For use with identification cards according to claim 8 including anti-adhesive means provided on said first plate and said second plate at the surface areas which face the identification sheet which is to be placed therebetween.

References Cited

UNITED STATES PATENTS

| | | | |
|---|---|---|---|
| 2,498,738 | 2/1950 | Lewis | 40—159 |
| 2,572,735 | 10/1951 | Kugel | 40—159 |
| 2,596,667 | 5/1952 | Ewald | 40—159 |
| 3,197,905 | 8/1965 | Wittle et al. | 40—158 |

EUGENE R. CAPOZIO, *Primary Examiner.*

W. J. CONTRERAS, *Assistant Examiner.*